United States Patent
Kothari et al.

(10) Patent No.: US 7,464,368 B2
(45) Date of Patent: Dec. 9, 2008

(54) LOGICAL SEPARATION OF CODE AND CONTENT

(75) Inventors: Nikhil Kothari, Sammamish, WA (US); Andrew C. Lin, Seattle, WA (US); Scott D. Guthrie, Bellevue, WA (US); Susan M. Warren, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

(21) Appl. No.: 10/410,096

(22) Filed: Apr. 8, 2003
(Under 37 CFR 1.47)

(65) Prior Publication Data

US 2004/0205707 A1 Oct. 14, 2004

(51) Int. Cl.
*G06F 9/44* (2006.01)

(52) U.S. Cl. .................. 717/106; 717/108; 717/110; 717/112; 715/517; 715/522; 715/523; 715/524

(58) Field of Classification Search ......... 717/109–123, 717/106, 125, 136, 166; 707/103, 103 R, 707/104.1; 715/513, 763
See application file for complete search history.

(56) References Cited

U.S. PATENT DOCUMENTS

| 6,105,036 | A * | 8/2000 | Henckel ................. 707/104.1 |
| 6,763,515 | B1 * | 7/2004 | Vazquez et al. ............. 717/109 |
| 6,804,682 | B1 * | 10/2004 | Kemper et al. .......... 707/103 R |
| 6,807,548 | B1 * | 10/2004 | Kemper .................. 707/103 R |
| 6,845,503 | B1 * | 1/2005 | Carlson et al. .............. 717/166 |
| 2003/0140334 | A1 * | 7/2003 | Grantson et al. ............ 717/125 |
| 2004/0040012 | A1 * | 2/2004 | Barsness et al. ............. 717/123 |
| 2004/0199906 | A1 * | 10/2004 | McKnight et al. .......... 717/136 |
| 2005/0022116 | A1 * | 1/2005 | Bowman et al. ............ 715/513 |
| 2005/0229154 | A1 * | 10/2005 | Hiew et al. .................. 717/110 |
| 2005/0240876 | A1 * | 10/2005 | Myers et al. ................ 715/763 |
| 2006/0015847 | A1 * | 1/2006 | Carroll, Jr. .................. 717/109 |

* cited by examiner

*Primary Examiner*—Lewis A. Bullock, Jr.
*Assistant Examiner*—Mark P. Francis
(74) *Attorney, Agent, or Firm*—Workman Nydegger (57) ABSTRACT

Code and content of a program can be logically separated for display and editing within an integrated development environment. The code and content are separated by the application of a separation algorithm that extracts the code and content into discrete buffers. A user can then designate what portions of the program they wish to view, including a code only view, a content only view, a design view, or a consolidated content and code view. While in any of the foregoing views, the program can be edited with tools and components provided by the integrated development environment. Thereafter, the logically separated portions of the program can be merged back together into a single program file.

44 Claims, 10 Drawing Sheets

LOGICAL SEPARATION OF CODE AND CONTENT

BACKGROUND OF THE INVENTION

1. The Field of the Invention

The present invention relates to the field of computers and, more particularly, to integrated development environments and computer interfaces that can be used for developing computer programs.

2. Background and Relevant Art

There are many types of systems and development environments that can be used by a computer programmer to develop code and create computer programs. These systems and environments are collectively referred to herein as Integrated Development Environments (IDEs). IDEs often include graphical interfaces comprising toolboxes of components that can be used for developing code. Non-limiting examples of programming components include controls, IDE extensions and plugins.

A Rapid Application Development (RAD) system, which exemplifies one type of an IDE, and that includes visual tools that can be selected by a programmer to build programs very quickly in a design environment, and without requiring the programmer to author every line of code. Non-limiting examples of RAD systems include Visual Basic, Delphi, Eclipse, Dreamweaver and Netbeans. RAD systems historically emphasized the programming speed at which code could be developed at the expense of generating efficient code. However, they can now be used to produce code quickly and without compromising the efficiency of the code.

Other traditional programming environments have also made improvements that enable them to utilize many of the visual tools and graphical interfaces that were previously available only in a RAD system. Accordingly, the distinction between RAD systems and non-RAD systems is somewhat blurred. Therefore, embodiments within the scope of the present application extend broadly to any IDE.

Even though existing IDEs are useful for enabling programs to be developed at a relatively fast rate and in a user-friendly manner, they are somewhat limited in their capabilities. In particular, existing IDEs do not provide interfaces that can be used to customize code that is generated in direct response to customized user input and existing IDE conditions (e.g., programming language, font characteristics, formatting, etc.). The components provided by existing IDEs are cookie-cutter, one size fits all, type tools that are not designed to develop customized code segments, but instead only standardized code segments.

Existing IDEs are also somewhat limited in their ability to develop and edit programs that contain both code and content because they are not currently configured to logically separate the code and content of a program. The term "code," as used herein, generally refers to the actual source code that is traditionally developed by a programmer. The term "content," as used herein, generally refers to the visual aspects of a program that are traditionally developed by a designer. An example of content includes the layout and graphics of a web page. Accordingly, HTML mark-up refers to content, rather than code in the context of the present application.

Programs containing both code (e.g., traditional source code in a programming language developed by a programmer) and content (e.g., web page constructs, graphics, texts, and other arbitrary markup elements developed by designers) are typically worked on by different groups of developers (programmers and designers) using different development tools. Accordingly, it would be useful to separate the code and content of a program to enable each portion of the program to be developed and edited independently by the appropriate group of developers. However, existing IDEs are not currently configured to logically separate the code and content of a program, particularly while maintaining the integrity of the program being developed.

Accordingly, there continues to exist a need in the art for improved IDEs and corresponding tools and techniques for developing and editing computing programs.

BRIEF SUMMARY OF THE INVENTION

The present invention is generally related to methods and systems for logically separating the code and content of one or more computing programs.

According to one aspect of the invention, an integrated development environment is configured to extract the code and content of a program into discrete buffers. A developer can then designate what portions of the program they wish to view, including a code only view, a content only view, a design view, or a consolidated content and code view.

The displayed portions of the program can then be edited while they are displayed in any of the foregoing views by the IDE. A developer can edit the code and content of the program, for example, with tools and components that are provided by the integrated development environment with RAD techniques or any other desired techniques. With or without being edited, the code and content can then be merged back together into a single program file.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems for displaying and editing programs within an Integrated Development Environment (IDE).

Figure 1:
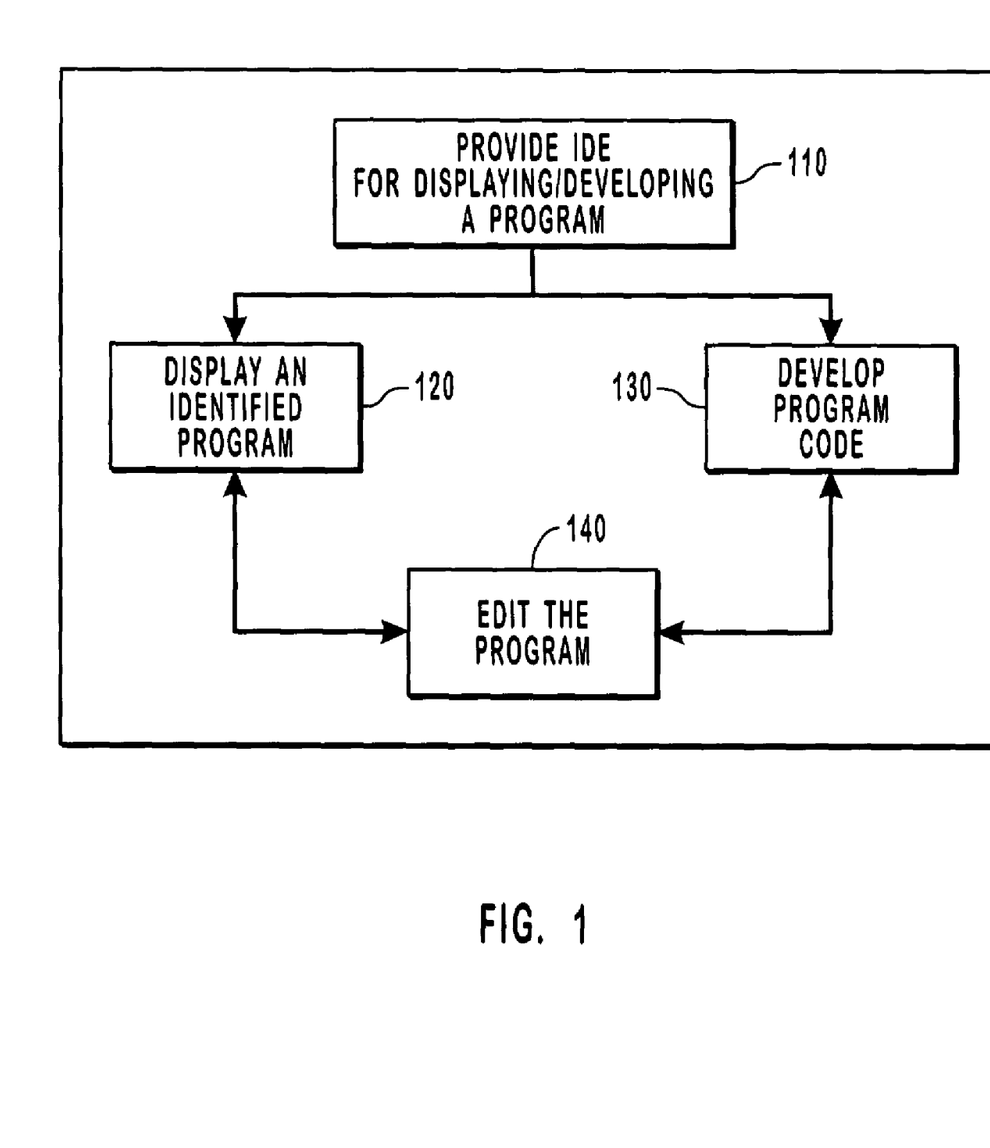
FIG. 1 illustrates a flow diagram of one embodiment of a method for developing and displaying programs according to the invention.

As illustrated in FIG. 1, the embodiments of the present invention generally include the acts of providing an IDE (act 110) that can be used to display (act 120), develop (act 130) and edit (act 140) computing programs in a desired manner. With particular reference to the present application, the IDE includes code builders that are configured to create customized programming code in response to user input. According to another aspect of the invention, the IDE is configured to identify and logically separate the code and content of a program. The code and content of a program can be displayed (act 120) in discrete and consolidated views, thereby enabling the programmers and developers to create (act 130) and edit (act 140) the program in a desired manner.

Although not required, the invention will be described in the general context of computer-executable instructions, such as program modules, being executed by computers in network environments. For example, according to one embodiment, the inventive IDE is generally provided (act 110) by programming modules that are stored within a single computing system or within a network of computing systems, or other corresponding computer-readable media. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the inventive IDE may be operated within a variety of computing environments, the IDE is preferably operated within a computing environment that includes at least a display device that is capable of displaying the interfaces of the IDE, as well as an input device for receiving user input.

It will be appreciated that the embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

Figure 10:
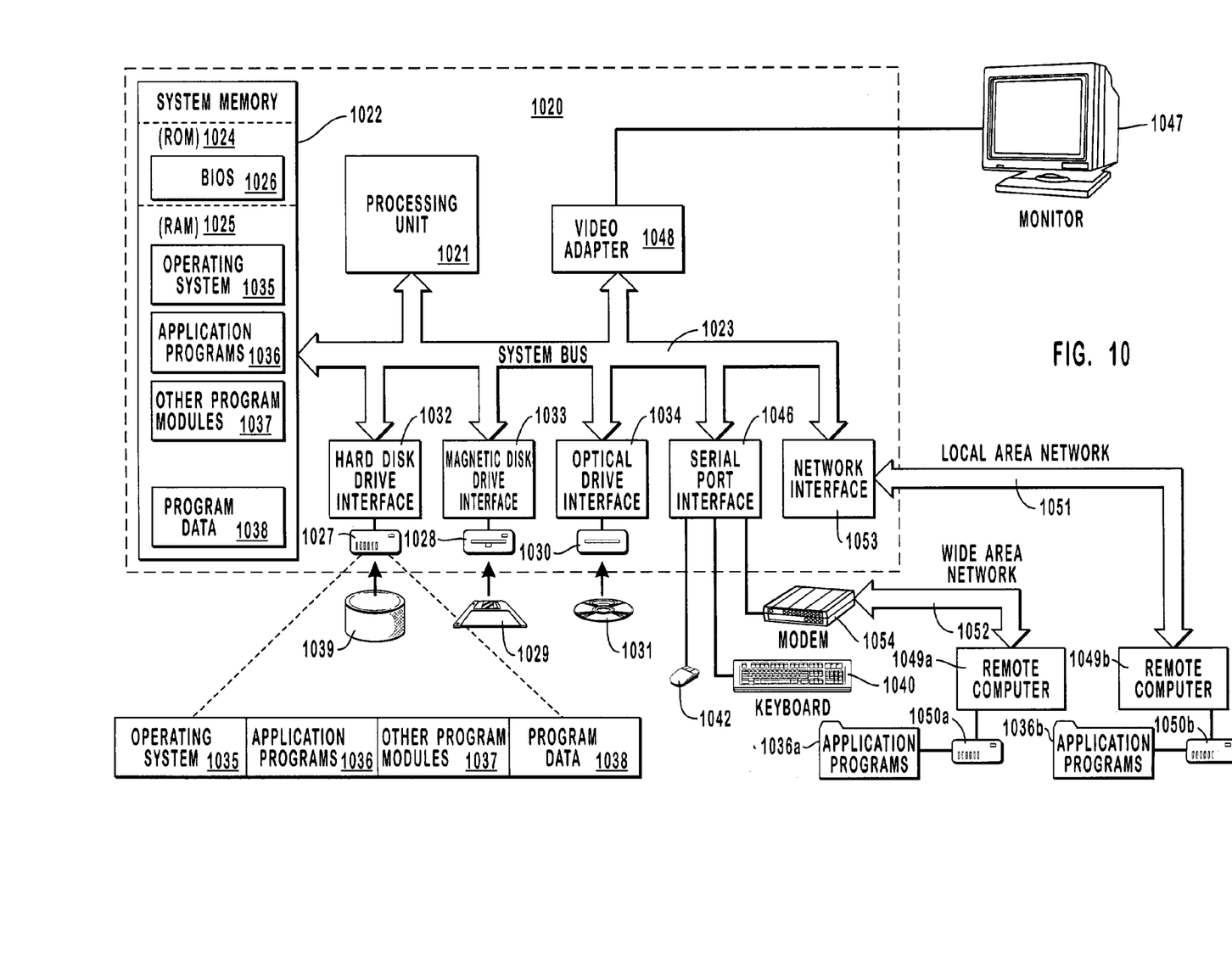
FIG. 10 illustrates one embodiment of a computing environment in which methods of the invention may be practiced.

FIG. 10, which is described below in detail, illustrates one example of a computing environment in which the inventive IDE can be operated and in which the corresponding methods of the invention may be practiced.

Code Builders for Generating Customized Code

Figure 2:
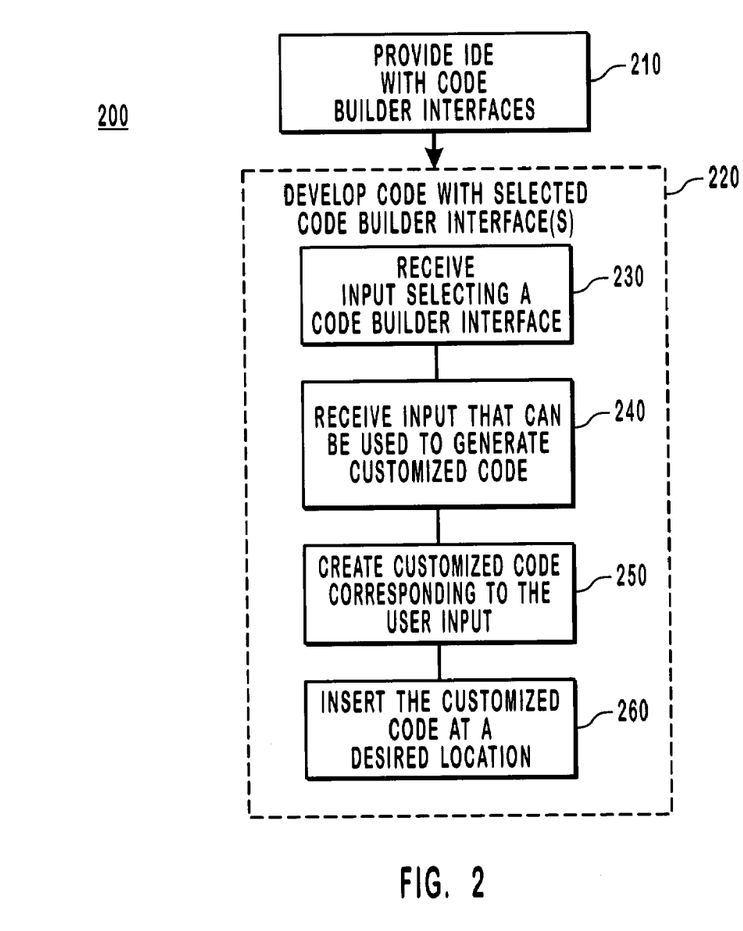
FIG. 2 illustrates a flowchart of one embodiment of a method for developing customized code according to the invention.

FIG. 2 illustrates a flowchart of one method for developing customized code within an IDE. As shown, the method includes an act of providing an IDE with code builder interfaces (act 210), a step for developing code with selected code builder interface(s) (step 220), and the corresponding acts of receiving input selecting a code builder interface (act 230), receiving input that can be used to generate customized code (act 240), creating customized code that corresponds to the user input (act 250), and inserting the customized code at a desired location (act 260) within the IDE. Each of the foregoing acts and step will now be described with specific reference to FIGS. 3 and 4.

Figure 3:
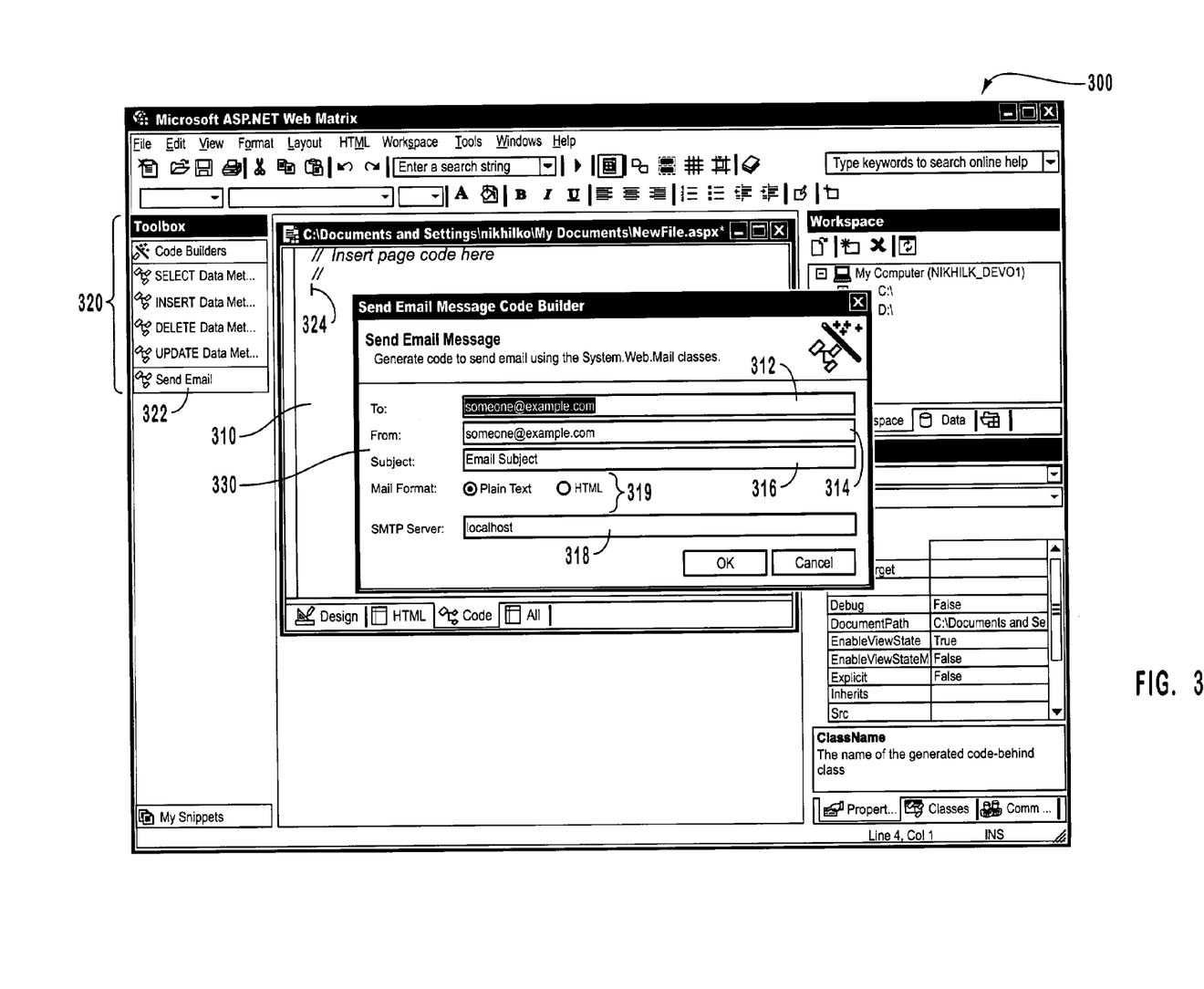
FIG. 3 illustrates one embodiment of an integrated development environment that includes a code builder interface configured to prompt a user for input that can be used to generate customized code in the view dedicated to editing code.

FIG. 3 illustrates one embodiment of an IDE 300 that includes a programming window 310 that is configured to receive user input and to display programming code and content. The IDE 300 also includes a toolbox 320 containing links to various code builders, (e.g., select data, insert data, delete data, update data, and send Email code builders). As described herein, the code builders are generally configured to generate customized code and to insert the code at a desired location within an existing or new program. According to one embodiment, the code builders customize code with user input that is obtained from corresponding code builder interfaces. This can be accomplished, for example, by applying the user input to a Document Object Model (DOM) configured to generate a class of code. Code DOMs are well-known in the art of computer programming and are not therefore described in detail herein. Essentially, a Code DOM defines the attributes and structure of programming objects, such as, for example, the code language and the statements and expressions contained in them.

When a code builder is selected from the toolbox 320 a corresponding code builder interface is launched that is configured to prompt a user for input that can be applied to a DOM of the selected code builder. The code builder DOM then generates and customizes the code in accordance with the user input. The customized code is then handed back to a source editor of the IDE 300 for insertion into the programming frame 310 at a designated and desired location.

According to one embodiment, the code builder is configured with sufficient programming modules to determine what language (e.g., C#, Visual Basic, etc.) the programmer is currently using, so as to know what language to generate the code in. The code builder also identifies other IDE programming conditions that may exist, to further ensure that the customized code is developed in a desired manner. For example, the set of available data connections, the formatting options and other existing IDE conditions may be applied to the code segments that are created before they are inserted into the programming frame 310.

An example will now be provided, with specific reference to a send Email code builder, to illustrate some of the features of the present invention. As shown, the send Email code builder icon 322 is displayed within the toolbox bar 320. The Email code builder is generally configured to generate customized code for sending email. First, the user selects the send Email code builder through any appropriate selection technique, such as, for example, by clicking on the Email code builder icon 322. In another embodiment, the send Email code builder is selected by dragging and dropping the send Email code builder icon 322 to a desired location (e.g., point 324) within the programming frame 310. The drop location is then used by the source code editor to designate where the generated code is inserted once it is created.

The foregoing examples for selecting a code builder, however, are merely illustrative and should not, therefore, be construed as limiting the scope of the invention. Accordingly, it will be appreciated that the code builders can also be selected in other ways, such as through pull-down menus or with any other suitable technique. It will also be appreciated that the act of receiving input selecting a code builder interface (act 230) occurs when a user selects a code builder as described above.

After the send Email code builder has been selected, a corresponding send Email code builder interface 330 is launched. In the present embodiment, the send Email code builder interface is configured to generate customized code to send Email to a designated party. In order to determine the parameters for sending the Email, the interface 330 provides various fields 312, 314, 316, 318 for receiving user input. For example, the user is prompted to designate the intended recipient(s) within type-in line 312, the sending party in type-in line 314, the subject in type-in line 316, and the SMTP server in type-in line 318.

Notwithstanding the foregoing example, it will be appreciated that the code builder interfaces can also be configured to prompt a user for other information that may be used to generate customized code. For example, the send Email code builder interface 330 could be configured to prompt a user for a file that is to be attached to the email, or for a location where the file is located.

The manner in which the code builder interfaces prompt a user for input can also be varied. In particular, the code builder interfaces are not limited to only receiving user input through type-in lines. For example, the Mail Format field 319 provides options that can be selected by clicking corresponding buttons displayed with the options. Pull-down menus can also be used to provide selections obtained by the code builder interface. In one embodiment, pull-down menus are provided with selections that have been obtained by querying one or more IDE services for available database connections, which provide information that is presented to the user for selection. In such an embodiment, for example, the type-in line 312 could be replaced with a pull-down menu containing a list of email contacts that are obtained by querying a database associated with a user's email address book.

With reference to FIG. 2, the act of receiving input that can be used to generate customized code (act 240) occurs when a user provides input to a code builder interface, as generally described above. The selected code builder then applies the user input that is received from the code builder interface to the corresponding code builder DOM to generate the customized code associated with the selected code builder (act 250). For example, with reference to the send Email code builder, the customized code developed by the send Email code builder will be configured to send email from a designated party to a designated recipient.

Figure 4:
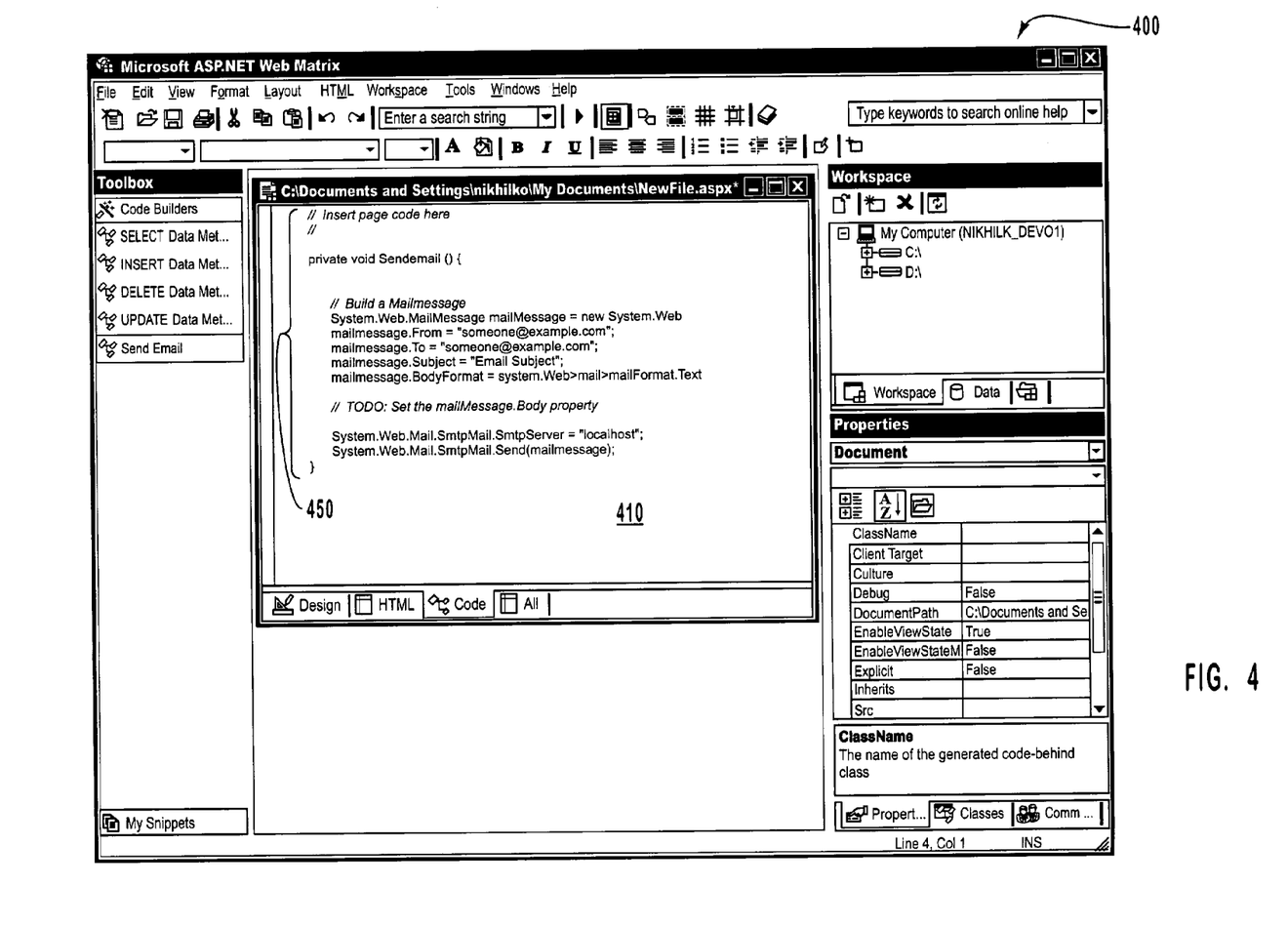
FIG. 4 illustrates one embodiment of the integrated development environment shown in FIG. 3 in which customized code has been generated and is being displayed.

FIG. 4 illustrates one embodiment of the IDE 400 in which customized code has been generated in response to user input received from the send Email code builder interface 330 of FIG. 3. As shown, the segment of code 450 that has been generated is customized to the particular input received by the user at the send Email code builder interface 330. It will also be appreciated that the segment of code 450 is inserted at the desired location within the programming window 410, as designated in FIG. 3 at reference point 324.

Although the foregoing example has been provided with specific reference to developing customized code for sending Email, it will also be appreciated that the code builders of the present invention can be configured to develop various types of customized code directed at performing a wide range of functionality. As shown in FIGS. 3 and 4, some non-limiting examples of other code builders include code builders directed at selecting data, inserting data, deleting data and updating data.

With reference to the method illustrated in the flow chart 200 of FIG. 2, it will be appreciated that the step for developing code with selected code builder interfaces (step 220) can include any suitable corresponding acts, including or excluding the illustrated acts 230, 240, 250 and 260. For example, the corresponding acts of identifying IDE conditions (e.g., programming language, font attributes, formatting, etc.) to apply to the customized code and querying databases to obtain information that can be used to generate the customized code can also comprise acts for developing code with code builder interfaces, as generally described above.

Logical Separation of Code and Content

The foregoing examples have been provided with specific reference to developing customized code in an IDE, it will be appreciated, however, that the programs developed by an IDE can also include code and content. The term "code," as used herein, generally refers to actual source code of a programming language such as C++, C#, Visual Basic, etc. The term "content," as used herein, generally refers to the visual aspects and mark-ups of a program. Code is traditionally developed by a programmer, whereas content is traditionally developed by a designer. An example of content includes the layout and graphics of a web page.

The development of programs containing both code and content traditionally includes collaboration between programmers and designers using different development tools to develop their corresponding portions of the program. To facilitate the development of the disparate portions of a complex program, therefore, it would be useful to separate the code and content to enable each portion to be developed and edited independently by the appropriate group of developers (programmers or designers) with the appropriate development tools. However, existing IDEs are not currently configured to separate the code and content of a program in a logical manner to enable this type of discrete program development. To overcome some of the foregoing limitations in the art, the present invention provides methods for displaying and editing a program containing both code and content in logically separate states.

Figure 5:
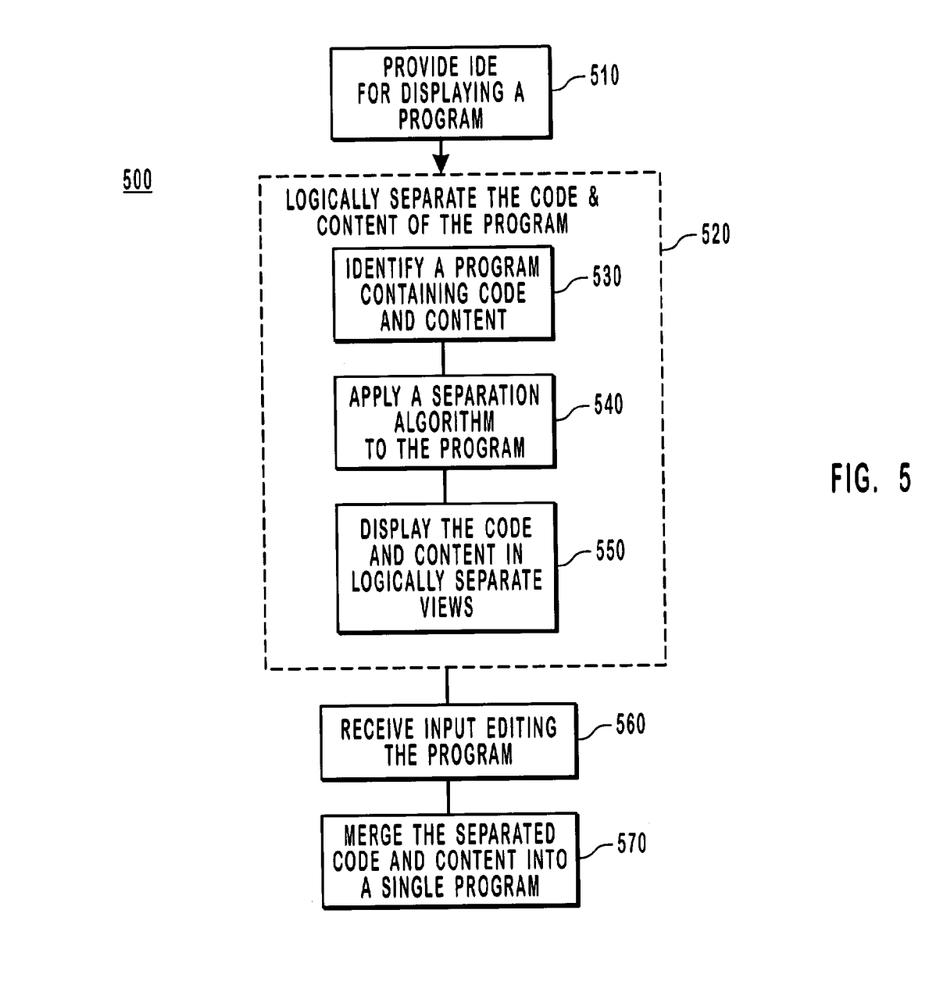
FIG. 5 illustrates a flowchart of one embodiment of a method for logically separating the code and content of a program within an integrated development environment.

The flowchart 500 of FIG. 5 illustrates acts and a step that may be performed to logically separate and display the code and content of a program. As shown, the first act includes providing an IDE for displaying a program (act 510). Next, the flowchart 500 includes a step for logically separating the code and content (step 520), including corresponding acts of identifying a program containing code and content (act 530), applying a separation algorithm to the program (act 540), and displaying the code and content in logically separate views (act 550).

The flowchart 500 also illustrates that certain methods of the invention include the act of receiving input editing a program (act 560) and the act of merging the separated code and content into a single program (act 570). It will be appreciated, however, that not all of the illustrated acts are necessary to perform each and every method of the invention. By way of example, and not limitation, the inventive method for separating the code and content of a program does not necessarily include acts 560 and 570. Rather, these acts (acts 560 and 570) are provided to illustrate that in certain embodiments, the inventive IDE is capable of editing and merging the separated code and content of a program.

One embodiment of a method for logically separating the code and content of a program will now be described with specific reference to FIGS. 6-9.

Figure 6:
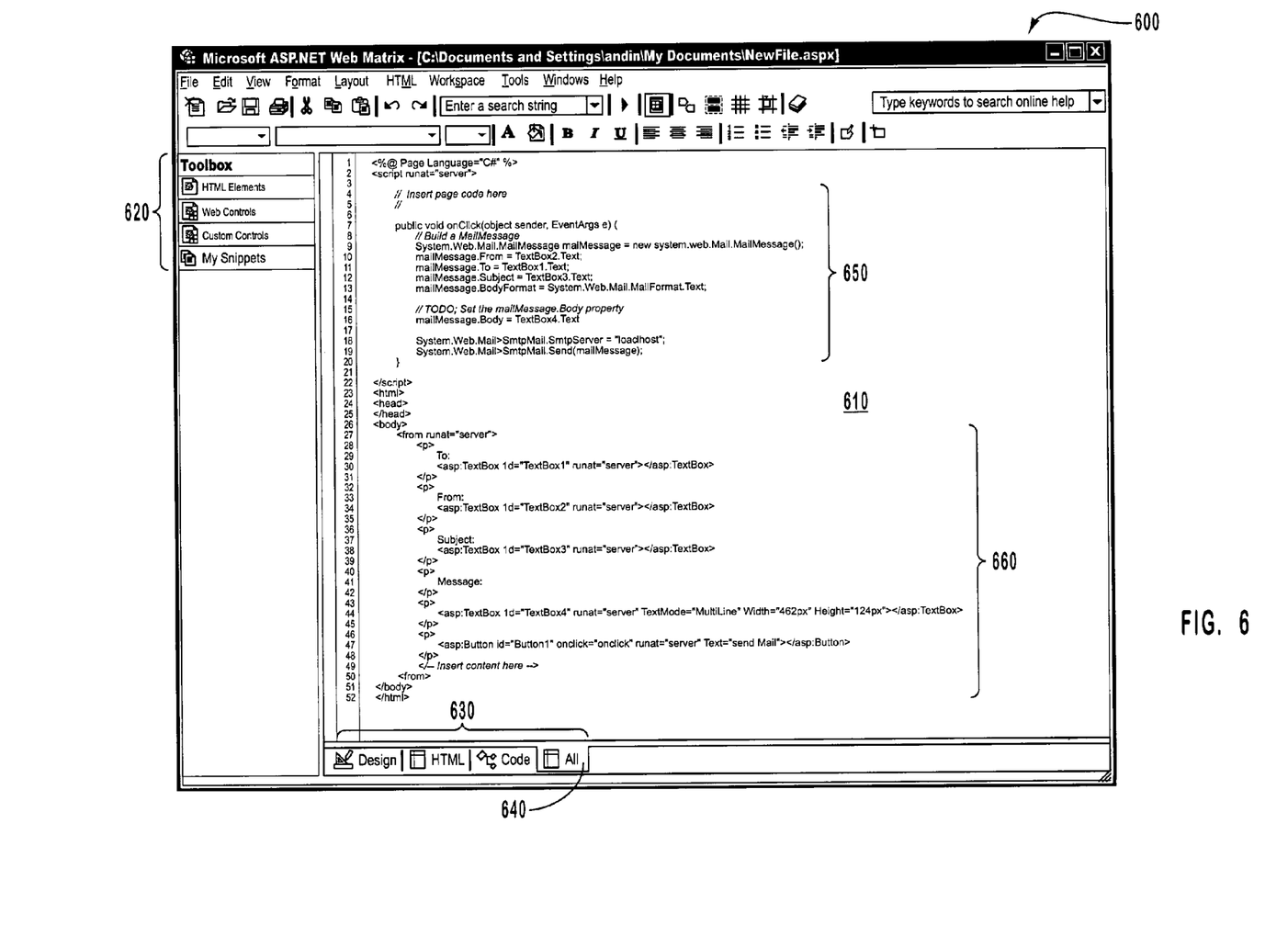
FIG. 6 illustrates one embodiment of the integrated development environment displaying the code and content of a program.

FIG. 6 illustrates an IDE 600 that is configured for displaying a program (act 510). In particular, IDE 600 includes a programming window 610 that is configured for displaying the code and content of a program. The IDE 600 also includes a toolbox bar 620 that identifies toolboxes of components and other development tools that can be selected to develop and edit the code and content of a displayed program.

In the present embodiment, the IDE 600 also includes a display menu bar 630 identifying the various views in which a program can be displayed. As indicated, the "All" option is currently selected, thereby designating that the programming window 610 shall display both the code and content of the program. Accordingly, all of the program segments 650 and 660, which respectively correspond with the code and content portions of the program, are currently displayed within the programming window 610.

Figure 7:
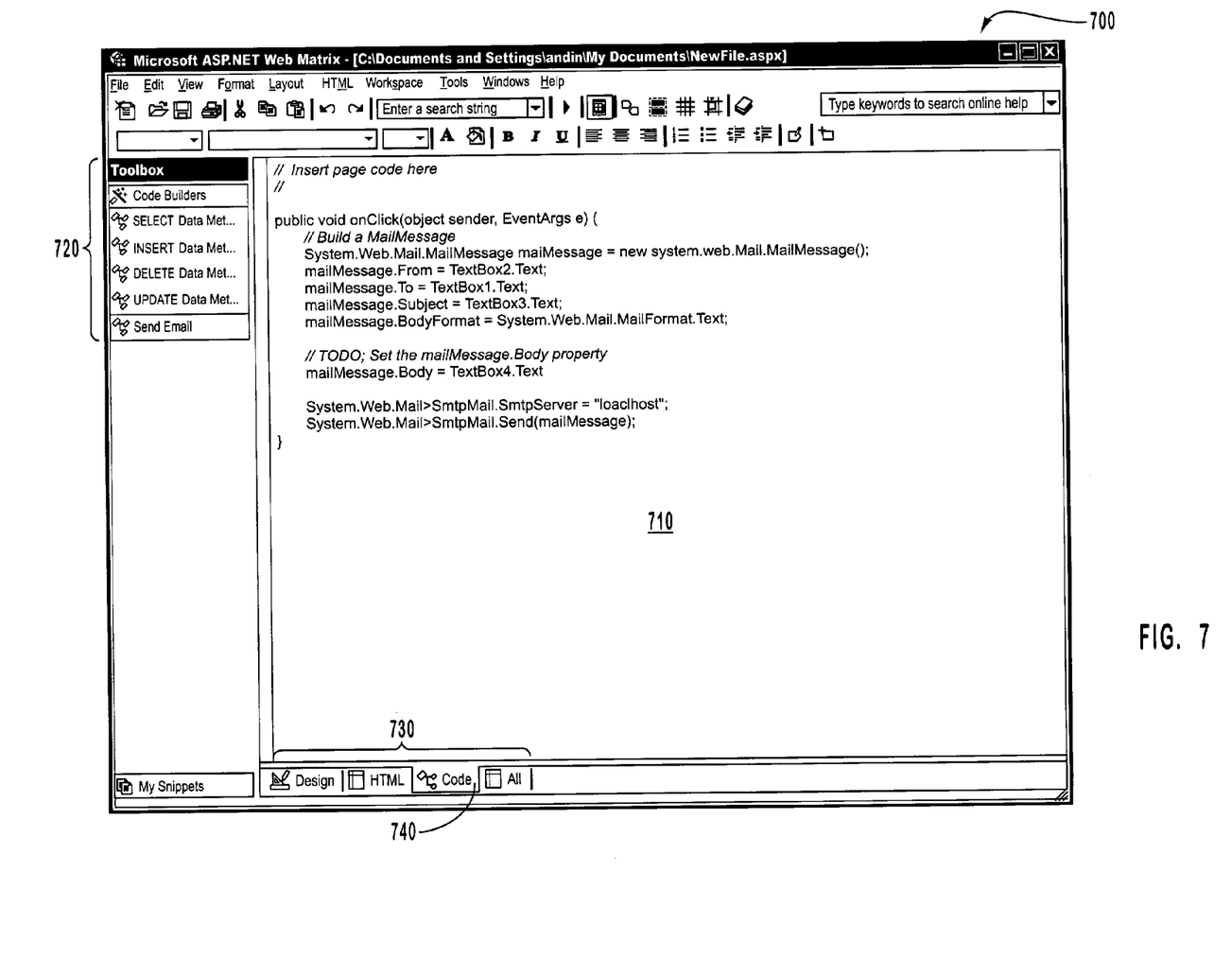
FIG. 7 illustrates one embodiment of the integrated development environment shown in FIG. 6 in which the code is extracted from the program and is displayed separately from the content of the program.
Figure 8:
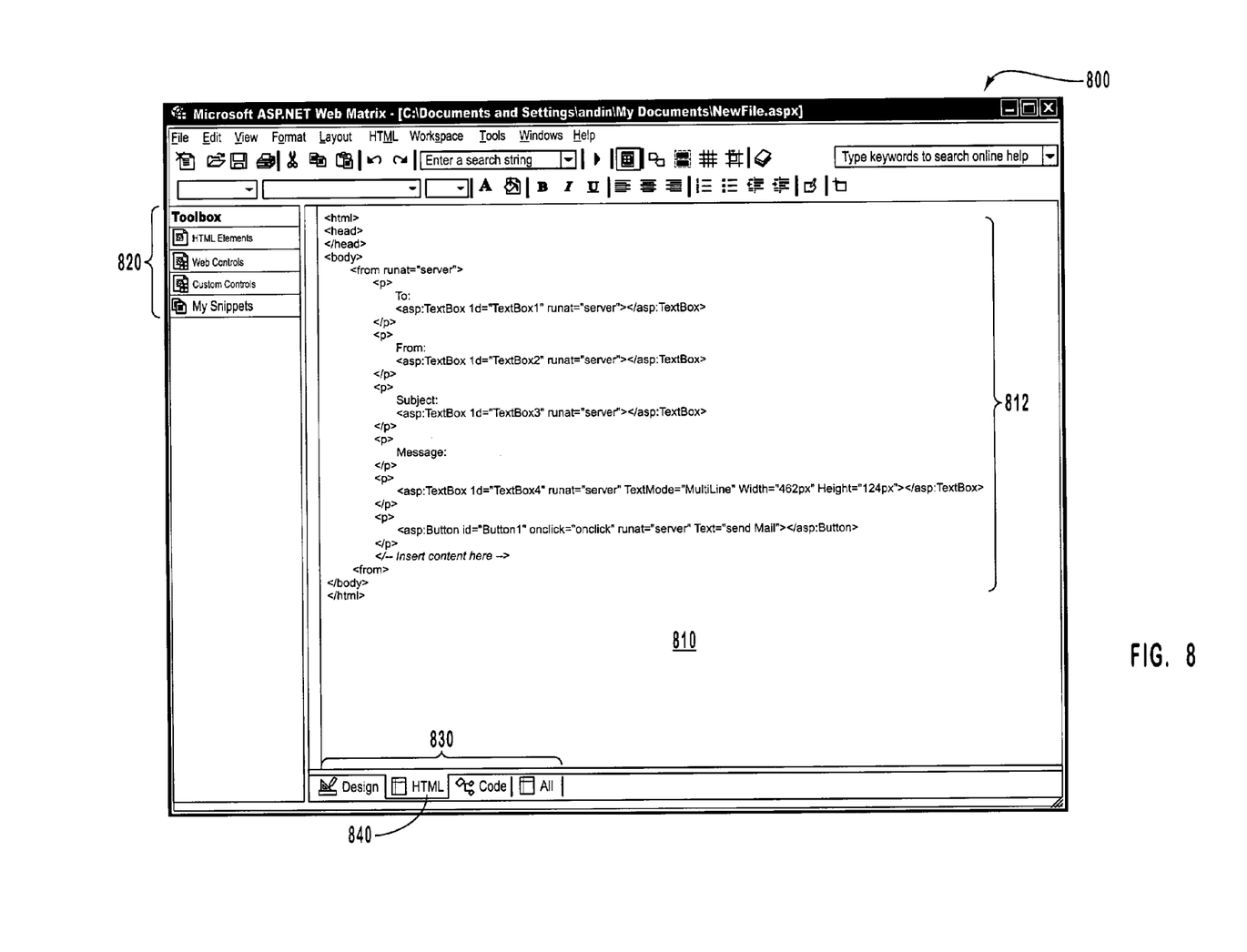
FIG. 8 illustrates one embodiment of the integrated development environment shown in FIG. 6 in which the HTML markup content is extracted from the program and is displayed separately from the code of the program.
Figure 9:
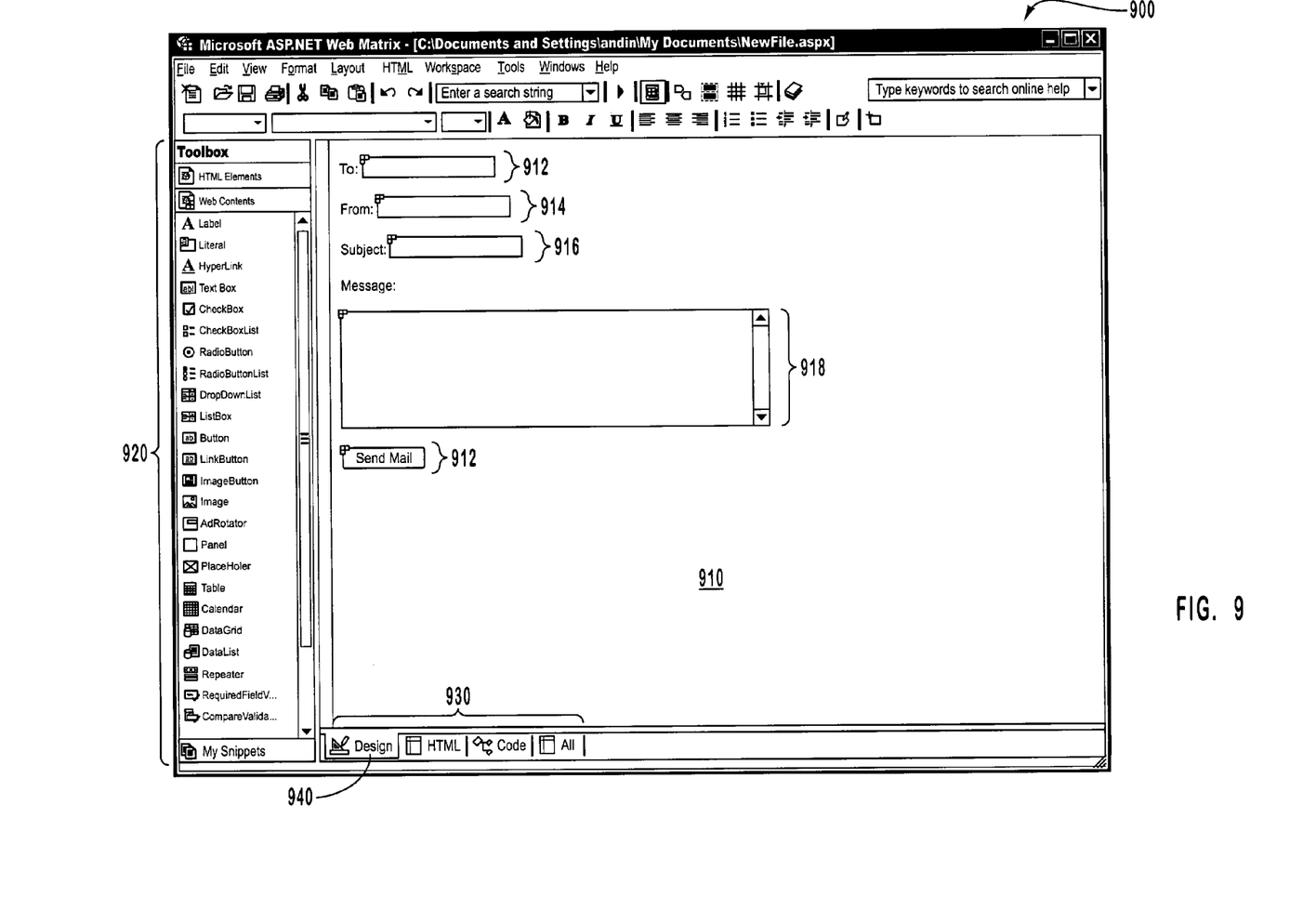
FIG. 9 illustrates one embodiment of the integrated development environment shown in FIG. 6 in which a design view of the HTML content extracted from the program is displayed separately from the code of the program.

When a user selects the Design, HTML or Code option from the display menu bar 630, the IDE 600 is directed to display the corresponding view of the logically separated code or content of the program, as shown in FIGS. 7-9. To enable the content and code to be displayed in logically separate states initially requires a logical separation of the code and content to be made. This can be accomplished, according to one embodiment of the invention, by applying a separation algorithm to the identified program (act 540).

An example will now be provided to further explain how a separation algorithm can be applied to a program to separate the code and content of the program. In this example, the program is contained in an .aspx file of the ASP.NET framework. It will be appreciated, however, that the methods of the present invention can also be applied to other program types having a format that supports the model of declarative content along with associated code, as does the .aspx file type.

When an .aspx file is identified and opened by the IDE for display on the programming window 610, then a WebForms document is created that contains an in-memory representation of the file in the form of a text buffer. The document also contains the separation algorithm that is used to extract and maintain each portion of the program separately. Once the WebForms document is loaded into the IDE 600, a directive parser is run to extract all of the directives defined in the program. The extracted directives are held in the form of a collection of directive objects by the WebForms document. Thereafter, the code is extracted using an expression from the separation algorithm, such as the following expression:

```
(
 (</script\s*>)|                            // End script tag
   (<script(
      \s+(?<attrname>[-\w]+)(               //Begin script tag
                                            // attribute name
        \s*=\s*"(?<attrval>[^"]*)" |        // double-quoted attribute value
        \s*=\s*'(?<attrval>[^']*)' |        // single-quoted attribute value
        \s*=\s*(?<attrval>[^\s=/>]*) |      //unquoted attribute value
        \s*=\s*(?<attrval><%#.*?%>) |       // databinding expression
        (?<attrval>\s*?)                    // no attribute value
      )
   )*\s*(?<empty>/)?>
(\n | \r)*                                  // whitespace after the begin
                                            script tag
   )
)
```

This causes a collection of matches to be returned as the algorithm loops through the program code and content. Two string buffers are maintained during this process, one for non-script text and another for script text. The algorithm initially adds the text of each match to the non-script string buffer. However, whenever the algorithm encounters a match that starts with "<script" and includes a "runat" attribute with a value equal to "server", it appends the subsequent matches to the script string buffer until it encounters the end script tag ("</script>"). In this manner, all of the code from the program is identified and held in the script string buffer. The script string buffer is then formatted to fix leading white-space indentation and is stored into a new instance of a text storage referred to as the code storage. The code can then be retrieved at any time from the code storage for display in a logically separate state from the content of the program.

FIG. 7 illustrates one embodiment in which the programming window 710 is used to display the code 712 that has been logically separated from the program illustrated in FIG. 6. According to the present embodiment, the IDE 700 has been directed to display only the code portions of the program by way of a selection made to the "code" display option 740 of the display menu bar 730. From this view, the code builders that were described above and that are presently identified in the code builder toolbox 720 can be utilized to develop and add new code segments to the code portion 712 of the program. Adding new code segments to existing code is one form of editing the program in response to user input (act 560). The changes made to the code of the program are written to the script string held in the code storage for later incorporation into a merged composite file that includes the content of the program.

Having separated the code and content, as described above, the content of the program can be retrieved from the buffer holding the non-script string for display. Prior to displaying the content of the program, the content can be modified to place in into an appropriate format for display, as was the code.

Editing Code and Content

FIG. 8 illustrates one embodiment of an IDE interface 800 that is being used to display the content portion 812 of the program in the programming window 810. The IDE interface 800 has been directed to display the content portion 812 of the program by way of a selection made to the display menu bar 830. In particular, the HTML option 840 has been selected, thereby causing the HTML markup content 812 to be displayed. In this view, the designer can edit the markup of the program manually or with tools from the toolbox 820. Changes made to the HTML content of the program are stored within the non-script string buffer for later incorporation into a merged program file.

FIG. 9 illustrates another embodiment of an IDE interface 900. In this embodiment, a design view option 940 has been selected from the display option menu 930, thereby causing a design view of the content to be displayed on the programming window 910 of the IDE interface 900. As shown, the design view includes the controls 912, 914, 916, 918 and 919 that correspond to the markup of the program. The illustrated design controls 912, 914, 916, 918 and 919 correspond with the HTML mark-up of the program, shown in FIG. 8. It will be appreciated, however, that in other embodiments, the design view may include other visual components, display surfaces, property grids and other elements besides those shown. Accordingly, it should be appreciated that the design view may display any design elements associated with a corresponding program.

While in the design view, the designer can move and edit the illustrated controls and can modify the overall look and feel of the program. The designer can also add new controls to the program with RAD type techniques. For example, the designer can select controls from the toolbox bar 920 and drag and drop them to desired locations within the program. The illustrated list of controls within the toolbox bar 920 should not be construed as limiting the scope of the invention.

As generally mentioned above, a program can be edited by the inventive IDE while it is displayed in any of the logically separated views or while being displayed in the consolidated "All" view. The inventive IDE also enables the code and content to be merged back into a single file, even after being edited, thereby preserving the integrity of the program. The technique for merging the code and content back into a single file essentially comprises a reverse application of the acts that were performed to logically separate the code and content. In particular, the WebForms document writes out all of the collected directives into a file stream. Next, it writes out the text contained within the code storage embedded within the <script run at="server"> tags to the file stream. Finally, it writes out the text from the non-script string buffer, which contains the content of the document, to the file stream. The resultant file comprises a composite file containing all of the code and content, including any edits made thereto.

Although the foregoing example goes into some detail regarding an algorithm and method for separating code and content contained in an .aspx file corresponding with the ASP.NET framework, it will be appreciated that the foregoing method and algorithm can also be modified to separate the code and content of other file types as well. For example, a program written in C# programming language (e.g., a .cs file) can have its code and content separated in a similar manner, by applying a separation algorithm to the program. The separation algorithm, however, will be configured to look for scripts such as "InitializeComponent( ) {" and a "}", so as to enable it to identify all content contained therein between. Other file types may also require different separation algorithms.

Inasmuch as there are many different types of programming languages and corresponding file types, the specific algorithms used to separate the code and content of the various program files will not be described herein. Rather, it will be appreciated that the scope of the invention applies to all programming formats that support the concept of declarative content and code, thereby enabling them to be identified and separated by a suitable separation algorithm.

In summary, the methods of the present invention enable the code and content of an identified program (act 530) to be logically separated with a corresponding separation algorithm (act 540) so that the code and content can be displayed in logically separate views (act 550). Once separated, the code and content can also be edited (act 560) and merged back into a single composite program file (act 570). The user interface to edit each logical portion is optimized to offer tools specific to the nature of the logical part being worked upon in a particular view.

According to another aspect of the invention, as described above, code builders can be used to generate code segments that are customized by user input that is received at one or more corresponding code builder interfaces. The customized code segments can comprise entire programs or code segments that are used to modify existing programs.

It will be appreciated that the functionality provided by the code builders of the invention and the ability of the inventive IDEs to logically separate code and content represent improvements over the existing art.

Operating Environment

It will also be appreciated by those of skill in the art that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 10 and the following discussion are intended to provide a brief, general description of a suitable computing environment for implementing certain elements of the invention. However, it should be emphasized that the present invention is not necessarily limited to any particular computerized system and may be practiced in a wide range of computerized systems.

According to one embodiment, the present invention includes one or more computer readable media storing computer-executable instructions, such as program modules, that can be executed by computing devices. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments, in addition to individual computing device, with many types of computer system configurations, including personal computers, hand-held devices, multi-processor systems, microprocessor-based or programmable consumer electronics, network PCs, minicomputers, mainframe computers, components thereof, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With specific reference to FIG. 10, an exemplary system for implementing certain elements of the invention includes a general purpose computing system in the form of a conventional computer 1020, including a processing unit 1021, a system memory 1022 comprising computer readable media, and a system bus 1023 that couples various system components including the system memory 1022 to the processing unit 1021. The system bus 1023 may be any of several types of bus structures including a memory bus or memory controller, a peripheral bus, and a local bus using any of a variety of bus architectures. The system memory includes read only memory (ROM) 1024 and random access memory (RAM) 1025. A basic input/output system (BIOS) 1026, containing the basic routines that help transfer information between elements within the computer 1020, such as during start-up, may be stored in ROM 1024.

The computer 1020 may also include a magnetic hard disk drive 1027 for reading from and writing to a magnetic hard disk 1039, a magnetic disk drive 1028 for reading from or writing to a removable magnetic disk 1029, and an optical disk drive 1030 for reading from or writing to removable optical disk 1031 such as a CD-ROM or other optical media. The magnetic hard disk drive 1027, magnetic disk drive 1028, and optical disk drive 1030 are connected to the system bus 1023 by a hard disk drive interface 1032, a magnetic disk drive-interface 1033, and an optical drive interface 1034, respectively. The drives and their associated computer-readable media provide nonvolatile storage of computer-executable instructions, data structures, program modules and other data for the computer 1020. These storage media can also be used to store data structures associating correction coefficients with gamma values, as described above. Although the exemplary environment described herein employs a magnetic hard disk 1039, a removable magnetic disk 1029 and a removable optical disk 1031, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 1039, magnetic disk 1029, optical disk 1031, ROM 1024 or RAM 1025, including an operating system 1035, one or more application programs 1036, other program modules 1037, and program data 1038. A user may enter commands and information into the computer 1020 through keyboard 1040, pointing device 1042, or other input devices (not shown), such as a microphone, joy stick, game pad, satellite dish, scanner, or the like. These and other input devices are often connected to the processing unit 1021 through a serial port interface 1046 coupled to system bus 1023. Alternatively, the input devices may be connected by other interfaces, such as a parallel port, a game port or a universal serial bus (USB). A monitor 1047 or another display device is also connected to system bus 1023 via an interface, such as video adapter 1048. In this context, the video adapter 1048 is considered to include a GPU as described above. In addition to the monitor, personal computers typically include other peripheral output devices (not shown), such as speakers and printers.

The computer 1020 may operate in a networked environment using logical connections to one or more remote computers, such as remote computers 1049a and 1049b. Remote computers 1049a and 1049b may each be another personal computer, a server, a router, a network PC, a peer device or other common network node, and typically include many or all of the elements described above relative to the computer 1020, although only memory storage devices 1050a and 1050b and their associated application programs 1036a and 1036b have been illustrated in FIG. 10. The logical connections depicted in FIG. 10 include a local area network (LAN) 1051 and a wide area network (WAN) 1052 that are presented here by way of example and not limitation. Such networking environments are commonplace in office-wide or enterprise-wide computer networks, intranets and the Internet.

When used in a LAN networking environment, the computer 1020 is connected to the local network 1051 through a network interface or adapter 1053. When used in a WAN networking environment, the computer 20 may include a modem 1054, a wireless link, or other means for establishing communications over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing communications over wide area network 1052 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that includes a processor and an integrated development environment configured to develop and display computing programs that include code and content, a method for logically separating the code and content of the one or more computing programs at the integrated development environment, the method comprising:

an act of identifying a program containing code portions and content portions, the code portions comprising text-format instructions of source code, and the content portions comprising graphical elements displayable to a user of the program and text-format instructions of the graphical elements, wherein text-format instructions defining layout or formatting of the graphical elements are included in the content portions as opposed to the code portions of the program;

an act of applying a separation algorithm to the program to separate the code portions and content portions of the program;

an act of identifying the code portions of the program;

extracting the code portions of the program into a desired display format;

in a first view at the integrated development environment, displaying the text-format instructions of the code portions independent of the content portions, and without also including the graphical elements and the text-format instructions of the content portions of the program; and in a second view at the integrated development environment, displaying the text-format instructions of the code portions in a single pane along with the text-format instructions of the content portions, wherein the code portions and the content portions displayed in the single pane are logically separate.

2. A method as recited in claim 1, further including an act of editing the code portions of the program.

3. A method as recited in claim 2, further including an act of merging the edited code portions and the content portions into a single program file.

4. A method as recited in claim 1, wherein the program is contained in a file format that supports declarative code and content.

5. A method as recited in claim 4, wherein the program is contained in a .aspx file format.

6. In a computing system that includes a processor and an integrated development environment configured to develop and display computing programs that include code and content, a method for logically separating the code and content of the one or more computing programs at the integrated development environment, the method comprising:
   an act of identifying a program containing code portions and content portions, the code portions comprising text-format instructions of source code, and the content portions comprising graphical elements displayable to a user of the program and text-format instructions of the graphical elements, wherein text-format instructions defining layout or formatting of the graphical elements are included in the content portions as opposed to the code portions of the program;
   an act of applying a separation algorithm to the program to separate the code portions and content portions of the program;
   an act of identifying the content portions of the program;
   extracting the content portions of the program into a desired display format;
   in a first view at the integrated development environment, displaying the text-format instructions of the content portions independent of the graphical elements of the content and independent of the text-format instructions of the code portions of the program; and
   in a second view at the integrated development environment, displaying the text-format instructions of the code portions in a single pane along with the text-format instructions of the content portions, wherein the code portions and the content portions displayed in the single pane are logically separate.

7. A method as recited in claim 6, further including an act of editing the content portions of the program.

8. A method as recited in claim 7, further including an act of merging the edited content portions and the content portions into a single program file.

9. A method as recited in claim 6, wherein the text-format instructions of the content portions include HTML markup, and wherein the graphical elements of the content portions are displayed in a design view that shows graphical objects and controls that are associated with the HTML markup.

10. A method as recited in claim 6, wherein the program is contained in a file format that supports declarative code and content.

11. A method as recited in claim 10, wherein the program is contained in a .aspx file format.

12. In a computing system that includes a processor and an integrated development environment configured to develop and display computing programs that include code and content, a method for logically separating the code and content of the one or more computing programs at the integrated development environment, the method comprising:
   an act of providing an integrated development environment that can be used to display a computing program;
   an act of identifying a computing program to be displayed, the computing program containing code and content, the code comprising text-format instructions of source code, and the content comprising graphics displayable to a user of the program and text-format instructions of the graphics, wherein text-format instructions defining layout or formatting of the graphics displayable to a user of the program are content as opposed to code;
   an act of applying a separation algorithm to the program to separate the code and content of the program;
   an act of displaying the code and content of the program in logically separate views at the integrated development environment, such that the text-format instructions of the code are displayed independent of the content portions, including the graphics and the text-format instructions of the content portions; and
   an act of displaying the text-format instructions of the code along with the text-format instructions of the content in a view, and within a single pane of the view, within the integrated development environment, wherein the code and content are logically separate.

13. A method as recited in claim 12, further including an act of receiving user input editing the program.

14. A method as recited in claim 13, wherein the user input editing the program includes user input editing the code of the program while the code of the program is displayed in a logically separate view.

15. A method as recited in claim 14, wherein the user input editing the program includes user input editing the content of the program while the content of the program is displayed in a logically separate view.

16. A method as recited in claim 12, further including an act of merging the separated code and content into a single program file.

17. A method as recited in claim 16, wherein prior to merging the separated code and content the method includes an act of editing at least one of the code and content with user input that is received while the code and content are displayed in logically separate views.

18. A method as recited in claim 12, wherein the program is contained in a file format that supports declarative code and content.

19. A method as recited in claim 18, wherein the program is contained in a .aspx file format.

20. A method as recited in claim 12, wherein the logically separate views includes a design view configured to display the graphics as visual objects and controls associated with the text-formatting instructions of the content of the program.

21. A method as recited in claim 12, wherein the text-format instructions of the content includes HTML markup.

22. A method as recited in claim 12, wherein the act of applying a separation algorithm to the program includes the act of first extracting any directives from the program.

23. A method as recited in claim 12, wherein the integrated development environment is configured to enable a user to toggle between the logically separate views.

24. A method as recited in claim 12, wherein the code and content are distinguished inasmuch as the code corresponds to actual source code of a programming language traditionally, although not necessarily, developed by a programmer, and inasmuch as the content corresponds to visual aspects and mark-ups of a program which are traditionally, although not necessarily, developed by a designer.

25. A method as recited in claim 12, wherein the code of the program is displayed in a different programming language than the content of the program.

26. In a computing system that includes a processor and an integrated development environment configured to develop and display computing programs that include code and content, a method for logically separating the code and content of the one or more computing programs at the integrated development environment, the method comprising:

an act of providing an integrated development environment that can be used to display a computing program;

an act of identifying the computing program to be displayed, the computing program containing code and content, the code comprising text-format instructions of source code, and the content comprising graphics displayable to a user of the program and text-format instructions of the graphics, wherein text-format instructions defining layout or formatting of the graphics displayable to a user of the program are content as opposed to code;

logically, separating the code and content of the program in such a manner that the code and content of the program can be displayed in independent and logically separate views within the integrated development environment, such that the text-format instructions of the code are displayed independent of the content portions, including the graphics and the text-format instructions of the content potions, portions, wherein logically separating the code and content of the program includes an act of evolving a separation algorithm to the program to separate the code and content of the program; and     an act of providing a view within the integrated development environment for viewing the text-format instructions of the code along with the text-format instructions of the content, within a single pane, wherein the code and content are logically separate.

27. A method as recited in claim 26, further including an act of displaying the code and content of the program in logically separate views.

28. A method as recited in claim 27, wherein integrated development environment enables the code and content to be edited while the code and content are displayed in the logically separate views.

29. A method as recited in claim 26, further including an act of merging the logically separated code and content into a single program file.

30. A method as recited in claim 29, wherein prior to merging the separated code and content the method includes an act of editing at least one of the code and content with user input that is received while the code and content are displayed in logically separate views.

31. A method as recited in claim 26, wherein the program is contained in a file format that supports declarative code and content.

32. A method as recited in claim 31, wherein the program is contained in a .aspx file format.

33. A computer program product for use in a computing system that includes an integrated development environment configured to develop and display computing programs that include code and content, the computer program product comprising:

one or more physical computer-readable media having computer-executable instructions for implementing a method for logically separating the code and content of the one or more computing programs at the integrated development environment, the method including:

an act of providing an integrated development environment that can be used to display a computing program;

an act of identifying a computing program to be displayed, the computing program containing code and content, the code comprising text-format instructions of source code, and the content comprising graphics displayable to a user of the program and text-format instructions of the graphics, wherein text-format instructions defining layout or formatting of the graphics displayable to a user of the program are content as opposed to code;

an act of applying a separation algorithm to the program to separate the code and content of the program;

an act of displaying the code and content of the program in logically separate views within the integrated development environment, such that the text-format instructions of the code are displayed independent of the content portions, including the graphics and the text-format instructions of the content portions; and     an act of displaying the text-format instructions of the code and the text-format instructions of the content of the program in the same view, and within a single pane of the same view, within the integrated development environment.

34. A computer program product as recited in claim 33, further including an act of receiving user input editing the program.

35. A computer program product as recited in claim 34, wherein the user input editing the program includes user input editing the code of the program while the code of the program is displayed in a logically separate view.

36. A computer program product as recited in claim 35, wherein the user input editing the program includes user input editing the content of the program while the content of the program is displayed in a logically separate view.

37. A computer program product as recited in claim 33, further including an act of merging the separated code and content into a single program file.

38. A computer program product as recited in claim 37, wherein prior to merging the separated code and content the method includes an act of editing at least one of the code and content with user input that is received while the code and content are displayed in logically separate views.

39. A computer program product as recited in claim 33, wherein the program is contained in a file format that supports declarative code and content.

40. A computer program product as recited in claim 39, wherein the program is contained in a .aspx file format.

41. A computer program product as recited in claim 33, wherein the logically separate views includes a design view configured to display the graphics as visual objects and controls associated with the text-format instructions of the content of the program.

42. A computer program product as recited in claim 33, wherein the text-format instructions of the content includes HTML markup.

43. A computer program product as recited in claim 33, wherein the act of applying a separation algorithm to the program includes the act of first extracting any directives from the program.

44. A computer program product as recited in claim 33, wherein the integrated development environment is configured to enable a user to toggle between the logically separate views.

\* \* \* \* \*